Patented Jan. 17, 1928.

1,656,535

UNITED STATES PATENT OFFICE.

HARRY A. SCHWARTZ, OF CLEVELAND HEIGHTS, OHIO, ASSIGNOR TO NATIONAL MALLEABLE AND STEEL CASTINGS COMPANY, OF CLEVELAND, OHIO, A CORPORATION OF OHIO.

ART OF MAKING MALLEABLE-IRON CASTINGS.

No Drawing.    Application filed March 23, 1926. Serial No. 96,876.

My invention relates to the treatment of iron and the conversion of such iron into malleable iron castings and is designed to overcome difficulties encountered in the malleableizing operation, in particular by improving that step of the process which involves treatment of the iron in the electric furnaces. I have found that in malleableizing iron castings which have been made from iron melted in cupolas and treated in basic lined electric furnaces, it has been difficult to speed the annealing operation and that normally the castings so made must be held at the high temperature zone of the annealing cycle for from seventy to eighty hours.

I have found that by using an acid lined electric furnace instead of a basic lined electric furnace and in changing the process in the particulars to which I will later refer, very good results can be obtained and a very considerable reduction in the time required for annealing may be effected with a very substantial increase in the rate of production. My invention also comprises various features which I shall hereinafter describe and claim.

A typical method of carrying out my invention is to melt the iron in accordance with the ordinary Kranz triplex practice in a cupola furnace and, if the iron is found too high in carbon, preferably to blow a portion of it in a Bessemer converter. The blown portion of the charge from which the carbon has been substantially eliminated in the converter is then combined with a larger portion of the molten iron which has an unreduced carbon content for the purpose of equalizing the amount of carbon contained in the two portions of the charge. These two portions of the charge are introduced into an acid lined electric furnace, the bottom of which is lined with silica sand or other acid material, and the walls and roof are made of silica brick. The molten metal in the electric furnace will then be protected by a silica or other acid slag which, when necessary, will be thinned with iron oxide additions, very basic silicates or ferro-manganese or other similar mediums used for diluting the slag and for making it more fluid. After the molten iron has been treated in the electric furnace, it is tapped out and cast into shapes and it is then annealed or malleableized in the usual way.

As the treatment in the acid lined electric furnace will not remove sulphur, the effect of sulphur in the iron may be controlled by additions of manganese, either in the cupola or in the electric furnace or in the ladle during the final pour. Or sulphur may be removed either before treatment in the electric furnace or after such treatment by the use of a suitable flux.

I believe that the reason for the length of time required for annealing iron which has been refined in a basic lined electric furnace is due to the absorption in the bath of an appreciable proportion of certain solid non-metallic impurities and that such impurities retard the annealing operation. My experience indicates that by treatment in an acid lined electric furnace the absorption of such harmful impurities in the bath is prevented.

I have also found that iron treated in the acid lined electric furnace, particularly if high in manganese sulfid, may carry a higher silicon content without danger of primary graphitization than iron made in a basic furnace. This additional silicon is a further, but not the sole, reason for an improved annealing quality.

By my improved process, I am not only able to obtain an improved product, but the period of time required to complete the annealing cycle is materially reduced, with the result that production is speeded up and production costs are materially lessened. I have also found that iron so produced is superior in machining qualities to that made in a basic lined electric furnace.

The terms and expressions which I have employed are used as terms of description and not of limitation, and I have no intention, in the use of such terms and expressions, of excluding any equivalents of the features shown and described, or portions thereof, but recognize that various modifications are possible within the scope of the invention claimed.

What I claim is:

1. The process of making malleable iron castings which comprises introducing molten iron into an acid lined electric furnace, casting the metal and subjecting it to a materially shortened annealing operation for the production of malleable iron castings, a desulphurizing agent being added at a stage prior to casting to nullify substantially the effects of sulphur.

2. The process of making malleable iron castings which comprises melting the iron in a cupola furnace, introducing the molten iron into an acid lined electric furnace, making additions to nullify substantially the effects of sulphur, reducing substantially the carbon content of the molten iron, casting the metal, whereby the metal is prepared for treatment in a materially shortened annealing operation, and subjecting it to an annealing operation for tne production of malleable iron castings.

3. The process of making malleable iron castings which comprises melting the iron in a cupola furnace, introducing the molten iron into an acid lined electric furnace, treating it therein under protection of an acid slag, tapping the metal out of the furnace into a ladle, treating the metal while in the ladle to nullify the effects of sulphur, casting the metal into shapes reducing substantially the carbon content of the molten iron prior to casting, the casting thereby being placed in a condition for treatment in a materially shortened annealing cycle, and finally annealing it.

4. The process of making malleable iron castings which comprises introducing molten iron into an acid lined electric furnace, casting the metal and subjecting it to an annealing operation for the production of malleable iron castings, manganese being added at a stage prior to casting to nullify substantially the effects of sulphur and also reducing substantially the carbon content of the iron prior to casting, whereby the annealing cycle is materially accelerated and a readily machinable product is produced, 5. The process of making malleable iron castings which comprises introducing molten iron containing high carbon into an acid lined electric furnace, adding other iron of lower carbon content than the first mentioned iron to reduce and equalize the percentage of carbon in the whole charge, casting the metal and subjecting it to an annealing operation for the production of malleable iron castings, whereby the annealing cycle is materially accelerated and a readily machinable product is produced.

HARRY A. SCHWARTZ.